United States Patent
Madsen et al.

(10) Patent No.: US 12,208,998 B2
(45) Date of Patent: Jan. 28, 2025

(54) TOWER FOR AN OFFSHORE WIND TURBINE COMPRISING A CRANE AND METHOD OF MANUFACTURING SUCH A TOWER

(71) Applicant: Vestas Wind Systems A/S, Aarhus N (DK)

(72) Inventors: Mikkel Møller Madsen, Grenaa (DK); Mikkel Pihl Jensen, Vejle (DK)

(73) Assignee: Vestas Wind Systems A/S, Aarhus N. (DK)

( * ) Notice: Subject to any disclaimer, the term of this patent is extended or adjusted under 35 U.S.C. 154(b) by 199 days.

(21) Appl. No.: 17/798,911

(22) PCT Filed: Mar. 10, 2021

(86) PCT No.: PCT/DK2021/050074
§ 371 (c)(1),
(2) Date: Aug. 11, 2022

(87) PCT Pub. No.: WO2021/180285
PCT Pub. Date: Sep. 16, 2021

(65) Prior Publication Data
US 2023/0098821 A1 Mar. 30, 2023

(30) Foreign Application Priority Data
Mar. 10, 2020 (EP) ..................................... 20161993

(51) Int. Cl.
*B66C 23/20* (2006.01)
*F03D 13/25* (2016.01)

(52) U.S. Cl.
CPC ............ *B66C 23/207* (2013.01); *F03D 13/25* (2016.05); *B66C 2700/0385* (2013.01); *F05B 2240/912* (2013.01); *F05B 2240/95* (2013.01)

(58) Field of Classification Search
CPC ........... B66C 23/207; B66C 2700/0385; F03D 13/25; F03D 13/10; F05B 2240/912;
(Continued)

(56) References Cited

U.S. PATENT DOCUMENTS 9,120,652 B2 * 9/2015 Munk-Hansen ........ B66C 23/18
9,428,369 B2 * 8/2016 Tieke .................... B66C 23/207
(Continued)

FOREIGN PATENT DOCUMENTS

CA    3012945 A1 * 10/2018 ........... B66C 23/207
DE    202014004373 U1    6/2014
(Continued)

OTHER PUBLICATIONS

European Patent Office, International Search Report and Written Opinion in PCT Application No. PCT? DK2021/050074, Jun. 9, 2021.
(Continued)

*Primary Examiner* — Sang K Kim
*Assistant Examiner* — Nathaniel L Adams
(74) *Attorney, Agent, or Firm* — Wood Herron & Evans LLP

(57) ABSTRACT

The invention relates to a method of manufacturing a tower (2) for an offshore wind turbine as well as such a tower. The method comprises providing the tower, mounting a crane (5) to an outer surface of the tower, and transporting the tower to the installation site of the wind turbine after the mounting of the crane. The crane comprises a base part (6) fixedly mounted to the tower, and a crane arm (7) pivotally connected to the base part at a first end (8). The method may further comprise a step of testing and certifying the crane according to a predetermined standard before the step of transporting the tower to the installation site. By application of the invention, the amount of installation work to be (Continued)

performed at the installation site can be minimized. In some embodiments of the invention, the crane arm has a shape matching the outer surface of the tower.

12 Claims, 4 Drawing Sheets

(58) Field of Classification Search
CPC .............. F05B 2240/95; F05B 2230/61; F05B 2250/141; Y02E 10/72; Y02E 10/727
See application file for complete search history.

(56) References Cited

U.S. PATENT DOCUMENTS

| | | | |
|---|---|---|---|
| 2013/0089405 A1* | 4/2013 | Wigant | B66C 23/64 414/803 |
| 2015/0086367 A1* | 3/2015 | Holloway | B66C 23/207 416/146 R |
| 2016/0068373 A1* | 3/2016 | Chin | B66C 23/207 212/253 |
| 2019/0338757 A1 | 11/2019 | Helmens | |
| 2023/0313781 A1* | 10/2023 | Botwright | B63B 81/00 212/307 |

FOREIGN PATENT DOCUMENTS

| | | | | |
|---|---|---|---|---|
| EP | 2551233 A1 * | 1/2013 | ........... | B66C 23/207 |
| EP | 3514100 A1 * | 7/2019 | ........... | B66C 23/207 |
| WO | 2017011417 A1 | 1/2017 | | |
| WO | 2020043257 A1 | 3/2020 | | |

OTHER PUBLICATIONS

European Patent Office, Extended Search Report in EP Application No. 20161993.9, Sep. 1, 2020.

* cited by examiner a)

b)

TOWER FOR AN OFFSHORE WIND TURBINE COMPRISING A CRANE AND METHOD OF MANUFACTURING SUCH A TOWER

FIELD OF THE INVENTION

The present invention relates to a method of manufacturing a tower for an offshore wind turbine as well as to such a tower. In particular, it relates to methods and towers, wherein a crane is mounted to an outer surface of the tower.

BACKGROUND OF THE INVENTION

The installation of an offshore wind turbine typically involves preparing a tower support at the installation site, manufacturing and transporting the tower to the installation site, and mounting the tower to the tower support. The tower is used to carry other parts of the wind turbine including the nacelle, the hub, and the blades. The tower support can comprise a transition piece that in turn is mounted to a monopile driven into the seabed. It may also comprise a jacket foundation or a gravity foundation, or it may be a floating foundation.

The tower support typically comprises an access platform onto which goods for use during the installation, repair and maintenance of the wind turbine can be loaded from a vessel. The access platform serves as a working area for the workers performing the installation, repair and maintenance. It is typically provided with a crane used for the transfer of the goods between the vessel and the access platform. Such a crane must be tested and certified after the mounting thereof on the platform to ensure that it meets the relevant health and safety standards and legal requirements. This testing and certification work typically has to be performed by people specially trained therefore. The cost thereof is part of the installation cost, and it can increase significantly if the weather conditions are so bad that the work is delayed. Since the crane is used to transfer goods needed for the rest of the installation work, the time spent on the preparation of the crane can delay the rest of the installation.

OBJECT OF THE INVENTION

It is an object of the present invention to provide a method with which the time consumption necessary for the installation of an offshore wind turbine at an installation site can be lowered compared to known methods.

It is an object of at least some embodiments of the present invention to provide a method with which the certification work required in relation to the installation of an offshore wind turbine can be facilitated compared to known methods.

It is a further object of the present invention to provide an alternative to the prior art.

In particular, it may be seen as an object of the present invention to provide a method that solves the above-mentioned problems of the prior art.

SUMMARY OF THE INVENTION

The above-described object and several other objects are intended to be obtained in a first aspect of the invention by providing a method of manufacturing a tower for an offshore wind turbine, wherein the tower is adapted to have, after installation of the wind turbine, a lower end thereof mounted to a tower support, the method comprising the steps of:

providing the tower,
mounting a crane to an outer surface of the tower, the crane comprising:
    a base part fixedly mounted to the tower, and
    a crane arm pivotally connected to the base part at a first end, and
subsequent to the mounting of the crane, transporting the tower to the installation site of the wind turbine.

By "tower support" is meant the structure carrying the tower. It may e.g. comprise a transition piece that in turn is mounted to a monopile driven into the seabed. It may also comprise a jacket foundation or a gravity foundation, or it may be a floating foundation.

In the following description, the term "tower" is used to describe the part of the wind turbine extending upwards from an access platform. The tower carries the nacelle at the upper end.

An advantage of mounting the crane to the outer surface of the tower before it is transported to the installation site of the wind turbine is that the amount of installation work to be performed at the installation site can be lowered compared to known methods. This is relevant both with respect to installations costs and because it lowers the requirements on how long a period with acceptable weather conditions that is needed before the crane is ready for use and thereby for the installation. The crane can be any type of crane, such as mechanical, electrical, or hydraulic.

The method may further comprise a step of testing and certifying the crane according to a predetermined standard before the step of transporting the tower to the installation site. Hereby is meant that the testing and certifying is performed after the crane has been mounted on the tower whereby the amount of installation work to be performed at the installation site can be further minimized, as the otherwise typically required offshore testing either becomes unnecessary or can be significantly limited. The mounting of the crane should be so that it is ensured that it does not move unintentionally after the testing and certification.

The crane will typically be designed to have a load-carrying capacity of a predetermined amount, such as 1 ton or 3 ton. However, the scope of protection covers any size and load-carrying capacity of the crane. The base part may be designed so that a first installed crane can be replaced by a crane with a different, such as higher, load carrying capacity without the need for re-certification.

In presently preferred embodiments of the invention, the crane is designed and mounted so that the crane arm is pivotally movable between a first configuration wherein the crane arm extends away from the tower so that, after installation of the wind turbine, the crane arm can be moved to extend beyond an outer edge of an access platform mounted to or being part of the tower support, and a second configuration wherein the second end of the crane arm is located above the access platform, so that the crane is adapted for use in transferring goods between a vessel and the access platform. The goods can e.g. be components or tools to be used by the workers performing the installation, repair or maintenance. In known designs, a corresponding crane for use in the transfer of goods between a vessel and the access platform is typically arranged on the access platform at a distance from the tower, such as near an outer edge of the access platform. Such a crane is often referred to as a Davit crane.

In some embodiments of the invention, the crane is designed and mounted so that the crane arm is further pivotally movable to a third configuration, wherein it is arranged in a rest position adjacent to the outer surface of the tower. In such embodiments, the tower and/or the crane may further comprise a locking mechanism for securely fixing the second end of the crane arm in the third configuration. This will be an advantageous safety measure when the crane is not in use, such as during the transportation of the tower to the installation site. The locking mechanism may e.g. be in the form of brackets and latches engageable therewith.

In embodiments of the invention, wherein the crane arm is pivotally movable to the third configuration as just described, the crane arm may be curved and have a shape matching the outer surface of the tower, so that when the crane arm is in the third configuration, the crane arm will be arranged adjacent to the outer surface of the tower along at least most of a full length of the crane arm. Hereby it can be obtained that is does not take up more space than necessary. Furthermore, the forces acting on the crane when it is in the third configuration can be minimized. An example of a possible design will be shown in the figures.

The step of fixedly mounting the base part of the crane to the outer surface of the tower may be performed by use of brackets and bolt connections. Hereby it is obtained that it is relatively easy to replace the crane with another one e.g. in case of wear or if it becomes necessary to change to a crane with a higher load carrying capacity. Alternatively, the base part of the crane may also be mounted by other known joining methods, such as welding or by screwing it directly onto the plates forming the tower.

A method of manufacturing a tower as described in any of the above embodiments may further comprise a step of electrically connecting the crane to a power supply of the wind turbine before the step of transporting the tower to the installation site. The power supply may e.g. be a diesel generator or a battery, and it may be mounted externally or internally with respect to the tower.

In a second aspect, the invention relates to a tower for an offshore wind turbine, wherein the tower is manufactured by a method as described above. In any of these embodiments, the crane arm may comprise a trolley so that it is easier to move goods to different locations on the access platform.

The first and second aspects of the present invention may each be combined. This means e.g. that a tower according to the second aspect of the invention can be a tower manufactured with any of the embodiments of a method according to the first aspect of the invention. These and other aspects of the invention will be apparent from and elucidated with reference to the embodiments described hereinafter.

BRIEF DESCRIPTION OF THE FIGURES

The method of manufacturing a tower for an offshore wind turbine as well as such a tower according to the invention will now be described in more detail with regard to the accompanying figures. The figures show one way of implementing the present invention and is not to be construed as being limiting to other possible embodiments falling within the scope of the attached claim set.

FIG. 2.a shows the crane arm in the first configuration, and FIG. 2.b shows the crane arm in the second configuration.

FIG. 5.a shows mounting with brackets and bolts, and FIG. 5.b shows mounting with bolts inserted in holes in the wall of the tower.

DETAILED DESCRIPTION OF AN EMBODIMENT

Figure 1:
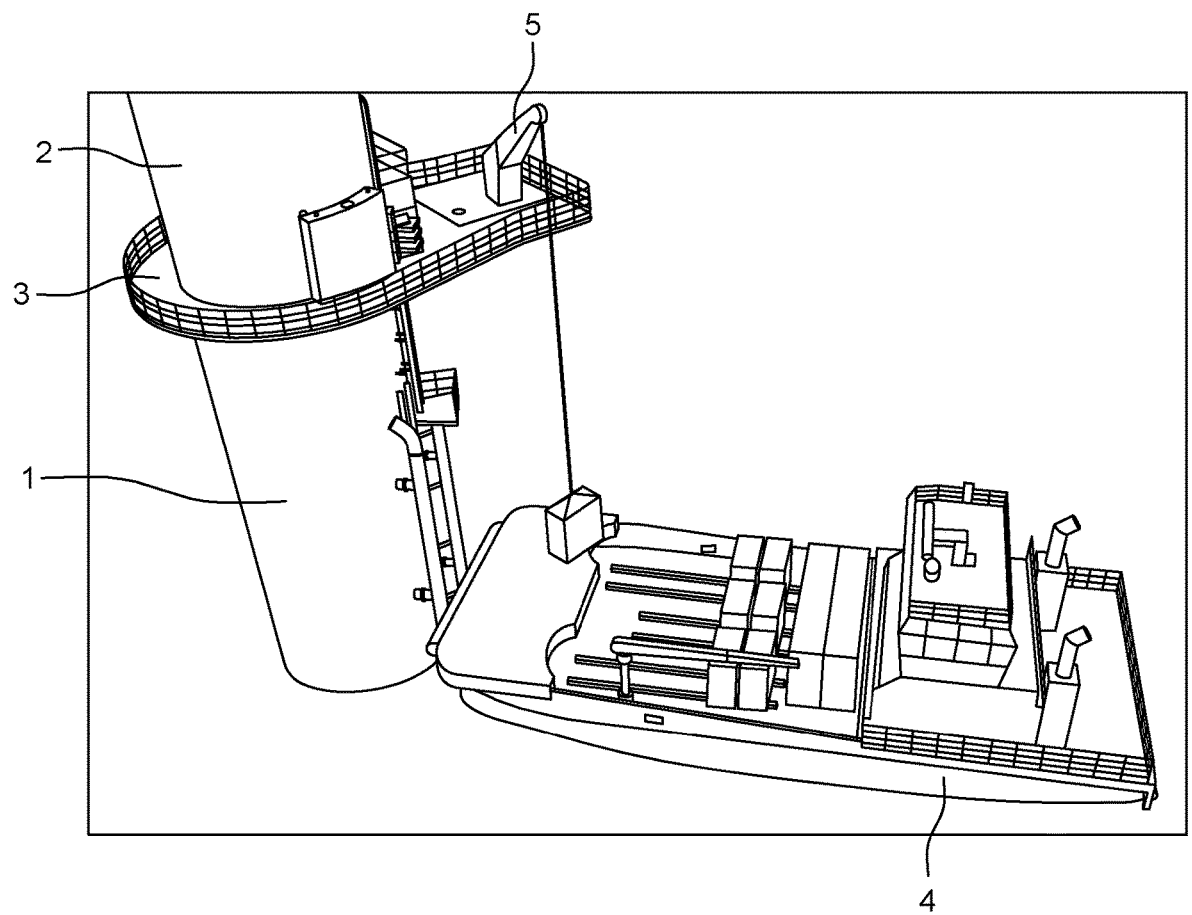
FIG. 1 shows schematically a lower end of a known offshore wind turbine mounted on a transition piece having an access platform with a Davit crane.

As described above, the installation of an offshore wind turbine typically involves preparing a tower support 1 at the installation site, manufacturing and transporting the tower 2 to the installation site, and mounting the tower 2 to the tower support 1. The tower support 1 is used to carry the tower and typically comprises an access platform 3 onto which goods for use during the installation can be loaded from a vessel 4. The access platform 3 also serves as a working area for the workers performing the installation of the wind turbine. The access platform 3 is provided with a crane 5 used for the transfer of the goods between the vessel 4 and the access platform 3. FIG. 1 shows schematically an example of a known design of a tower support 1 with an access platform 3. A lower part of the tower 2 is shown as extending upwards from the tower support 1. The tower 2 is used to carry other parts of the wind turbine including the nacelle, the hub, and the blades. These other parts are left out from the figures. The tower support 1 is typically also provided with other components, such as ladders for use by the workers to enter the access platform 3.

A tower 2 according to the present invention differs from the one shown in FIG. 1 in that a crane 5 is mounted to an outer surface of the tower 2 before the tower is transported to the installation site of the wind turbine. This crane 5 is intended to be used instead of the Davit crane shown in FIG. 1, but they could also be used in combination, if desired. The step of mounting the crane 5 is typically performed onshore, but it could in principle also be performed at another location at sea, such as at a designated area near a harbour where the sea may be calmer than at the installation site.

Figure 2A:
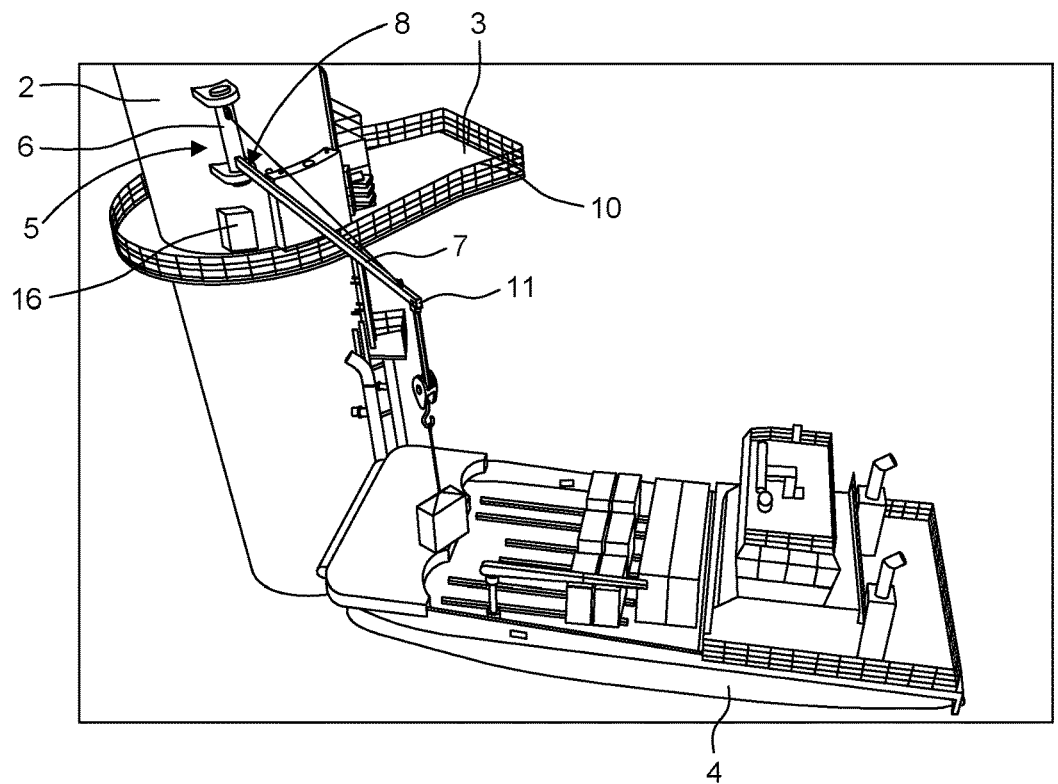
FIG. 2 shows schematically an embodiment of a wind turbine tower having a crane mounted thereon.
Figure 2B:
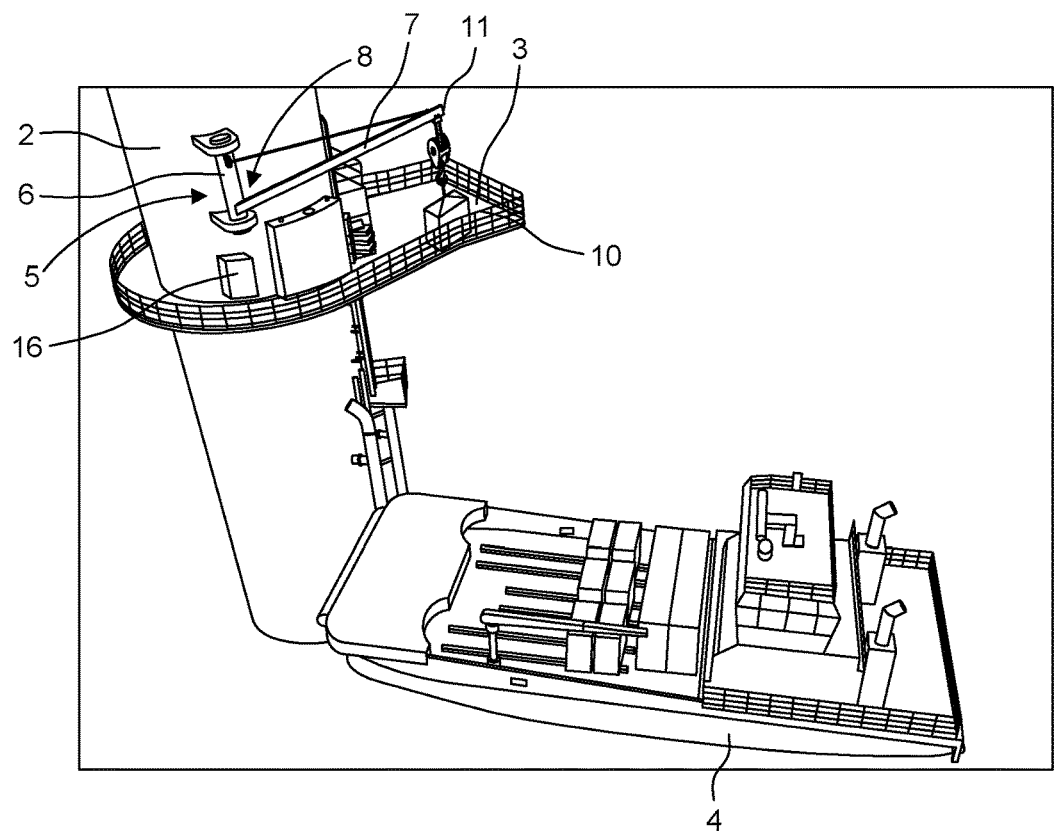

FIG. 2 shows schematically a lower part of the tower 2 with a crane 5 mounted thereon. The crane 5 comprises a base part 6 fixedly mounted to the tower 2 and a crane arm 7 pivotally connected to the base part 6 at a first end 8. The crane 5 is designed and mounted so that the crane arm 7 is pivotally movable between a first configuration as shown in FIG. 2.a and a second configuration as shown in FIG. 2.b. In the first configuration, the crane arm 7 extends away from the tower 2 so that the crane arm 7 can be moved to extend beyond an outer edge 10 of the access platform 3 mounted to or being part of the tower support 1. In the second configuration, the second end 11 of the crane arm 7 is located above the access platform 3. By this design and arrangement of the crane, it is adapted for use in transferring goods between a vessel and the access platform.

Figure 3:
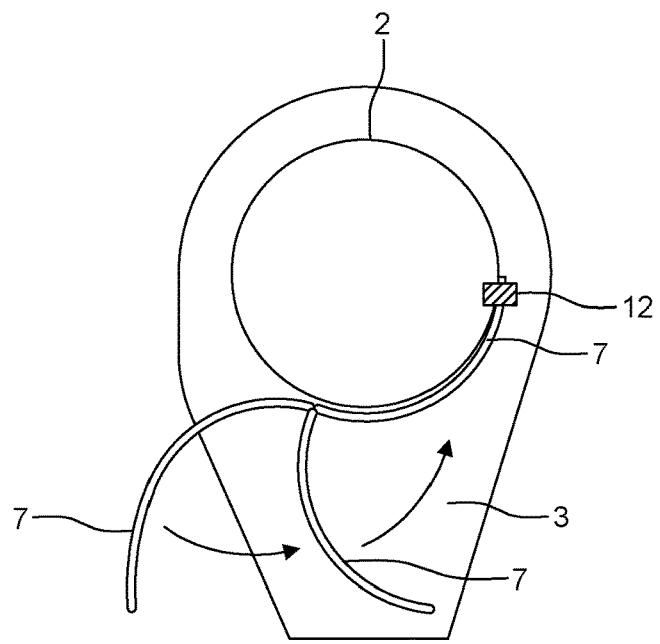
FIG. 3 shows schematically another embodiment of a wind turbine tower having a crane with a curved crane arm mounted thereon. The figure is a top view showing the three different configurations of the crane arm in one figure.

The crane arm of the embodiment in FIG. 2 is shown as being straight. An alternative design of the crane arm 7 is shown schematically in FIG. 3, wherein the crane arm 7 is curved and has a shape matching the outer surface of the tower 2. FIG. 3 is a top view showing the crane arm 7 in the first configuration, the second configuration, and third configuration in the same figure. As seen from FIG. 3, the crane 5 is being designed and mounted so that the curved crane arm 7 is further pivotally movable to a third configuration, wherein it is arranged in a rest position adjacent to the outer surface of the tower 2. For such an embodiment, it will be advantageous to build-in a locking mechanism 12 for securely fixing the second end of the crane arm in the third configuration.

Figure 4:
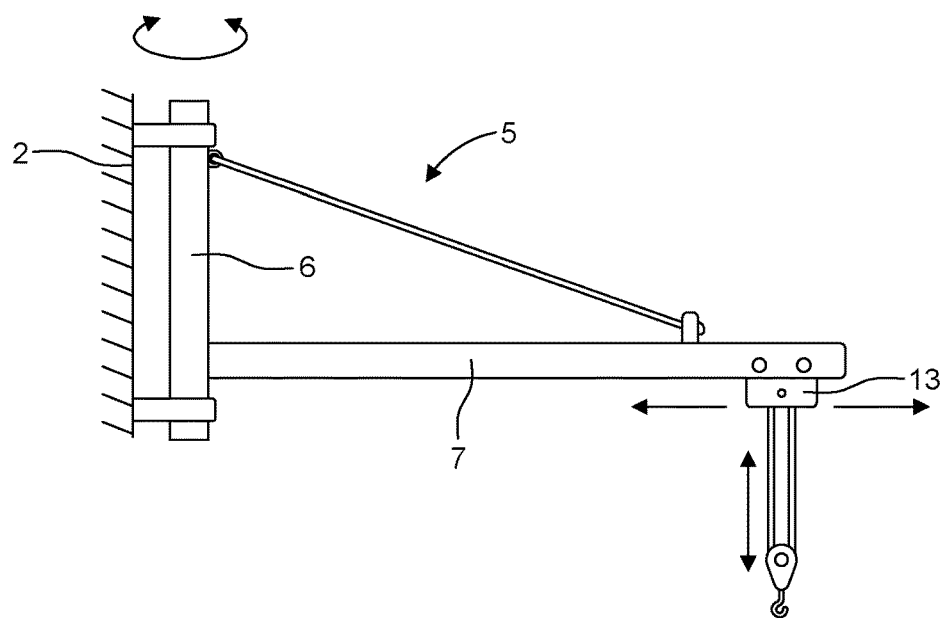
FIG. 4 shows schematically the crane in FIG. 2 or 3 having a trolley that is movable along the crane arm.

In order to facilitate the transfer of goods by use of the crane 5 to a larger area of the access platform 3, the crane arm 7 may be provided with a trolley 13 as shown schematically in FIG. 4. The design and control of such a trolley 13 will be known to a person skilled in the art.

Figure 5:
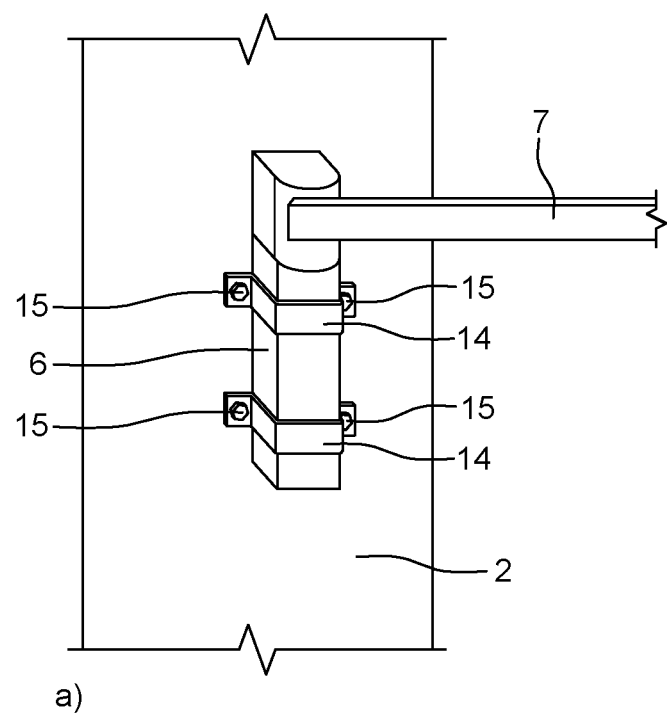
FIG. 5 show schematically two examples of how the crane can be mounted to the tower.
Figure 5:
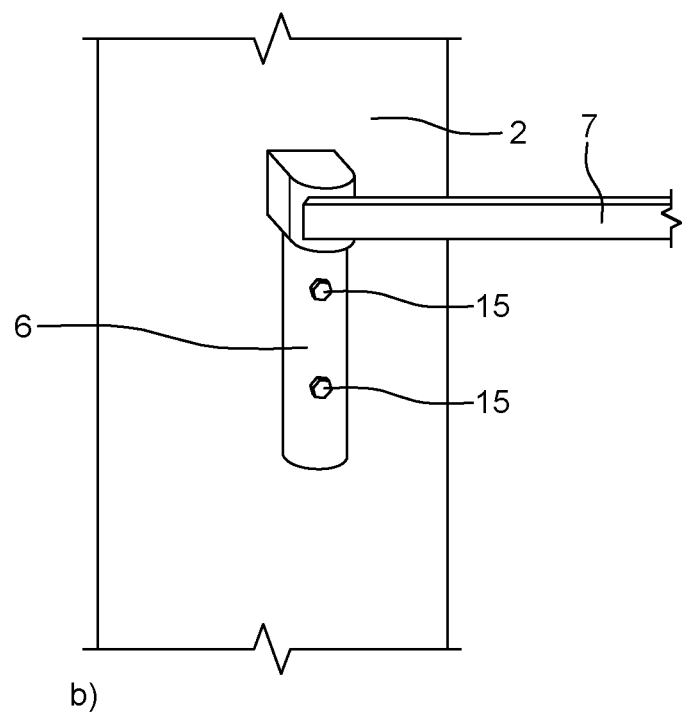

FIG. 5 shows schematically two different ways of mounting the base part 6 of the crane to the outer surface of the tower 2. In FIG. 5.*a*, the connection has been established by use of brackets 14 and bolts 15. In FIG. 5.*b*, the connection has been established by bolts 15 inserted directly in holes in the plates forming the circumferential wall of the tower 2.

As described above, an advantage of mounting the crane 5 to the tower 2 before transporting it to the installation site is that this makes it possible to test and certify the crane 5 according to a predetermined standard before the transportation of the tower 2 to the installation site. These activities can thereby be performed under more controllable and more comfortable working conditions than at the installation site where the weather may be harsh. A related advantage thereof is that the time needed for the installation can be lowered which also lowers the cost. Yet a further advantage that lowers the cost of installation is that the testing and certifying work typically needs to be performed by people specially trained therefore. Thus, by having this part of the work performed onshore removes the need for paying for these specially trained people having to travel to the installation site, including potentially waiting for appropriate weather conditions.

The manufacturing a tower 2 according to the present invention may also include electrically connecting the crane 5 to a power supply of the wind turbine before the step of transporting the tower 2 to the installation site. Such a step is advantageous for the same reasons given in relation to the possible testing and certifying. The power supply may e.g. be a battery or a diesel generator as shown schematically as a box 16 in FIG. 2.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Furthermore, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method of manufacturing a tower for an offshore wind turbine, wherein the tower is adapted to have, after installation of the wind turbine, a lower end thereof mounted to a tower support and an upper end mounted to a nacelle, the method comprising the steps of:

providing the tower,
mounting a crane to an outer surface of the tower between the lower end and the upper end, the crane comprising:
a base part fixedly mounted to the tower, and
a crane arm pivotally connected to the base part at a first end, and
subsequent to the mounting of the crane, transporting the tower to an installation site of the wind turbine.

2. The method according to claim 1, further comprising a step of testing and certifying the crane according to a predetermined standard before the step of transporting the tower to the installation site.

3. The method according to claim 1, wherein the crane is designed and mounted so that the crane arm is pivotally movable between:
a first configuration wherein the crane arm extends away from the tower so that, after installation of the wind turbine, the crane arm can be moved to extend beyond an outer edge of an access platform mounted to or being part of the tower support, and
a second configuration wherein the second end of the crane arm is located above the access platform,
so that the crane is adapted for use in transferring goods between a vessel and the access platform.

4. The method according to claim 3, wherein the crane is designed and mounted so that the crane arm is further pivotally movable to a third configuration, wherein the crane arm is arranged in a rest position adjacent to the outer surface of the tower.

5. The method according to claim 4, wherein the crane arm is curved and has a shape matching the outer surface of the tower, so that when the crane arm is in the third configuration, the crane arm will be arranged adjacent to the outer surface of the tower along at least most of full length of the crane arm.

6. The method of claim 4, further comprising securing the crane arm in the third configuration.

7. The method according to claim 1, wherein the step of mounting the crane to an outer surface of the tower further comprises fixedly mounting the base part of the crane to the outer surface of the tower using brackets and bolt connections.

8. The method according to claim 1, further comprising a step of electrically connecting the crane to a power supply of the wind turbine before the step of transporting the tower to the installation site.

9. The method of claim 1, wherein mounting the crane to an outer surface of the tower between the lower end and the upper end further comprises mounting the crane adjacent the lower end of the tower.

10. The method of claim 1, wherein mounting the crane to an outer surface of the tower between the lower end and the upper end further comprises mounting the crane to the tower so as to be closer to the lower end than the upper end.

11. The method of claim 1, wherein mounting the crane to an outer surface of the tower between the lower end and the upper end further comprises mounting the crane so that after installation of the wind turbine, the crane is below the nacelle.

12. The method of claim 1, wherein the crane arm further includes a trolley, and the method further comprises moving the trolley along the crane arm.

\* \* \* \* \*